(12) United States Patent
Shor

(10) Patent No.: US 7,778,362 B2
(45) Date of Patent: Aug. 17, 2010

(54) METHOD AND DEVICE FOR OFDM CHANNEL ESTIMATION

(75) Inventor: Gadi Shor, Tel-Aviv (IL)

(73) Assignee: Wisair Ltd., Tel Aviv (IL)

( * ) Notice: Subject to any disclaimer, the term of this patent is extended or adjusted under 35 U.S.C. 154(b) by 1451 days.

(21) Appl. No.: 11/092,013

(22) Filed: Mar. 28, 2005

(65) Prior Publication Data

US 2006/0215774 A1    Sep. 28, 2006

(51) Int. Cl.
*H04L 27/06* (2006.01)
(52) U.S. Cl. .................................................. 375/340
(58) Field of Classification Search .............. 375/260, 375/340; 370/203, 331, 510
See application file for complete search history.

(56) References Cited

U.S. PATENT DOCUMENTS

| | | | |
|---|---|---|---|
| 7,016,429 B1 * | 3/2006 | Dogan et al. ............... 375/279 |
| 7,426,175 B2 * | 9/2008 | Zhuang et al. .............. 370/203 |
| 2002/0075904 A1 * | 6/2002 | Dabak et al. ............... 370/510 |
| 2004/0105409 A1 * | 6/2004 | Razoumov et al. ........... 370/332 |
| 2005/0041588 A1 * | 2/2005 | Kim et al. ................... 370/236 |
| 2005/0190871 A1 * | 9/2005 | Sedarat ...................... 375/350 |
| 2005/0226140 A1 * | 10/2005 | Zhuang et al. .............. 370/203 |
| 2005/0265221 A1 * | 12/2005 | Batra et al. ................. 370/208 |
| 2006/0034378 A1 * | 2/2006 | Lindskog et al. ............ 375/260 |
| 2006/0189279 A1 * | 8/2006 | Kobayashi et al. .......... 455/101 |
| 2007/0109262 A1 * | 5/2007 | Oshima et al. .............. 345/156 |

* cited by examiner

*Primary Examiner*—David C Payne
*Assistant Examiner*—Leon-Viet Q Nguyen
(74) *Attorney, Agent, or Firm*—Oren Reches

(57) ABSTRACT

A method and device for OFDM transmission, the method includes: (i) defining a channel estimation sequence that is characterized by a low peak to average ratio at a significant guard to information power ratio; and (ii) transmitting the channel estimation sequence over multiple over multiple sub-carriers. A method and device for OFDM transmission, the method includes: (i) providing a channel estimation sequence that is characterized by a low peak to average ratio over a significant range of guard to information power ratio; and (ii) transmitting the channel estimation sequence over multiple sub-carriers.

21 Claims, 9 Drawing Sheets

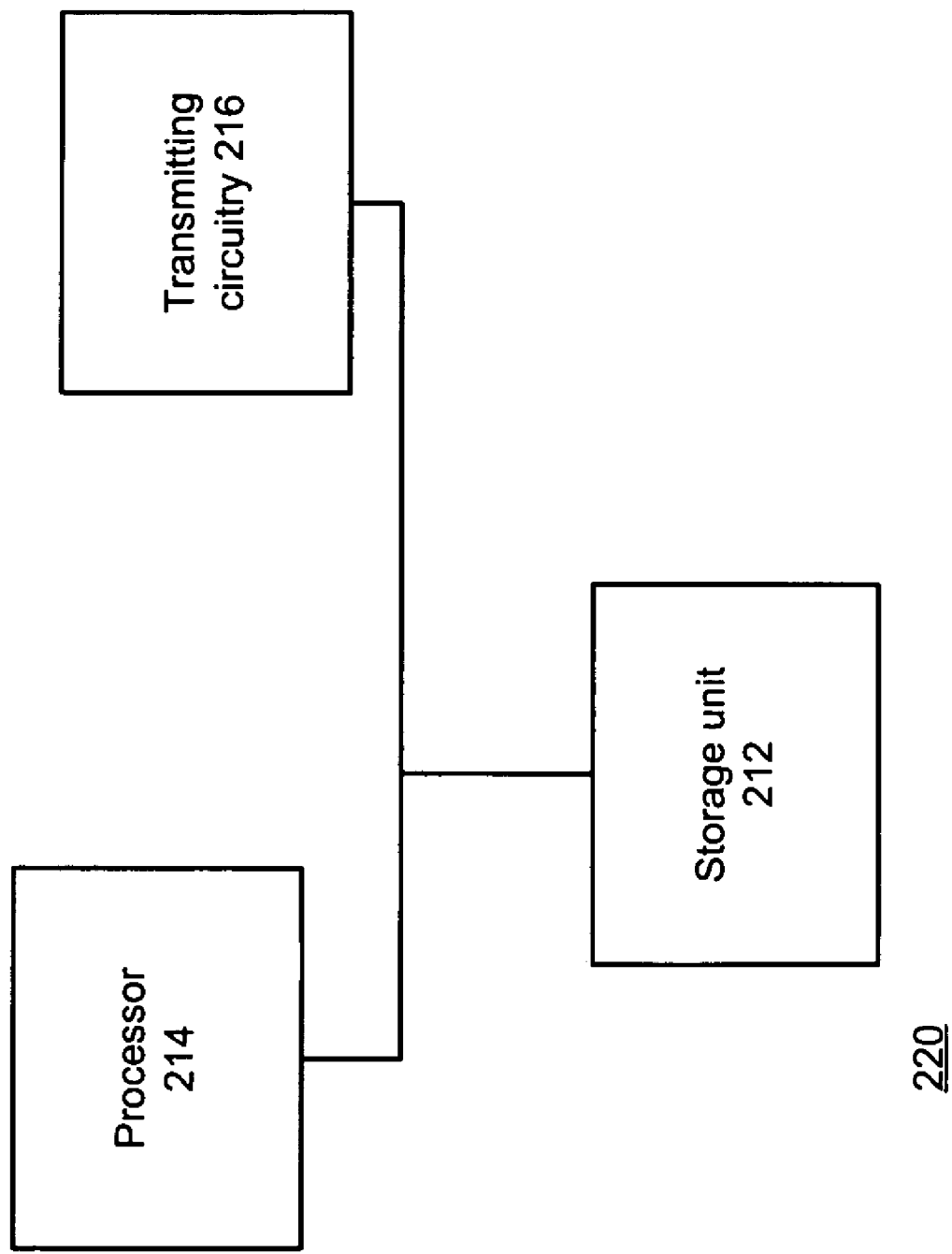

US 7,778,362 B2

METHOD AND DEVICE FOR OFDM CHANNEL ESTIMATION

FIELD OF THE INVENTION

The invention relates to a method and device for Orthogonal Frequency Division Multiplexing (OFDM) channel estimation.

BACKGROUND OF THE INVENTION

OFDM is a technique that used multiple sub-carriers to convey information. A typical OFDM symbol includes multiple data sub-carriers and optional pilot sub-carriers. Various networks, including Ultra Wide Band networks utilize OFDM techniques.

FIG. 1 is a schematic illustration of two ultra wide band wireless networks (also referred to as personal access networks) 10 and 20, each including multiple devices that wirelessly communicate with each other. First network 10 includes first till third devices A-C 11-13 and the second network 20 includes forth till sixth devices D-F 24-26. The devices exchange information and utilize channel estimation sequences in order to properly receive transmitted information.

Due to various regulations Ultra Wide Band (UWB) symbols include guard sub-carriers with redundant information. The ratio between the power of guard sub-tones and the power of data tones (also referred to guard to information power ratio) is not fixed. Each vendor can define a certain ratio, as long as the power ratio falls within an allowed power ratio range.

OFDM symbols propagate through a wireless medium that usually changes its characteristics over time and even over frequencies. In order to allow proper reception of OFDM symbols an UWB transmitter transmits to a receiver a predefined channel estimation sequence. The receiver compares the receiver channel estimation sequence to the expected predefined sequence and extracts the channel response. After learning the channel response the receiver can reconstruct various received symbols.

Various OFDM devices and OFDM channel estimation methods are described in the following patents, patent applications and articles, all being incorporated herein by reference: U.S. Pat. No. 6,640,088 of Thomas el at, titled "Method and system for adaptive channel estimation techniques"; European Patent Application EP1416689 titled "Channel estimation using the guard interval of a multicarrier signal"; European Patent Application EP141477, titled "Channel estimation for OFDM using orthogonal training sequences"; PCT application publication number WO 03/100986, titled "System and method for data detection in wireless communication systems"; PCT application publication number WO 03/052979, titled "Method and system for adaptive channel estimation techniques"; PCT application publication number WO 02/23850, titled "OFDM communication methods and apparatus"; U.S. patent application publication No. 2003/0210749 of Asjadi, titled "receiver"; "OFDM channel estimation in the presence of asynchronous interference", by A. Jeremic, T. A. Thomas, and A. Nehorai, 2003 IEEE International Conference on Acoustics, Speech, and Signal Processing, 2003, and "A study of channel estimation in OFDM systems", by S. Coleri, M. Ergen, A. Puri and A. Bahai, 2002 IEEE.

One of the problems associated with UWB OFDM networks is a relatively high peak to average ratio of the transmitted symbols. This can require very linear high power transmitters and also require low noise receivers that are characterized by a high dynamic range. Various solutions were suggested to solve this problem. One of the solutions includes duplicating an input data stream with multiple different sequences and selecting the product that is characterized by the lowest peak to average ratio.

There is a need to provide a device and method for OFDM channel estimation that is characterized by a low peak to average ratio over a range of data to guard sub-carrier power ratio.

SUMMARY OF THE INVENTION

An OFDM device, including: a first unit, adapted to define a channel estimation sequence that is characterized by a low peak to average ratio at a significant guard to information power ratio; and a transmitting path, adapted to transmit the channel estimation sequence over multiple sub-carriers.

A computer readable medium having code embodied therein for causing an electronic device to perform the stages of: defining a channel estimation sequence that is characterized by a low peak to average ratio at a significant guard to information power ratio; and transmitting the channel estimation sequence over multiple over multiple sub-carriers.

A computer readable medium having code embodied therein for causing an electronic device to perform the stages of: defining a channel estimation sequence that is characterized by a low peak to average ratio at a significant guard to information power ratio; and transmitting the channel estimation sequence over multiple sub-carriers.

An OFDM device, including: a first unit, adapted to provide a channel estimation sequence that is characterized by a low peak to average ratio over a significant range of guard to information power ratio; and a transmitting path, adapted to transmit the channel estimation sequence over multiple sub-carriers.

A method for orthogonal frequency division multiplexing (OFDM) transmission, the method including the stage of: defining a channel estimation sequence that is characterized by a low peak to average ratio at a significant guard to information power ratio; and transmitting the channel estimation sequence over multiple over multiple sub-carriers.

A method for orthogonal frequency division multiplexing (OFDM) transmission, the method including the stage of: providing a channel estimation sequence that is characterized by a low peak to average ratio over a significant range of guard to information power ratio; and transmitting the channel estimation sequence over multiple sub-carriers.

BRIEF DESCRIPTION OF THE DRAWINGS

The present invention will be understood and appreciated more fully from the following detailed description taken in conjunction with the drawings in which:

FIG. 5 illustrates an OFDM transmitter according to another embodiment of the invention;

DETAILED DESCRIPTION OF THE DRAWINGS

Figure 1:
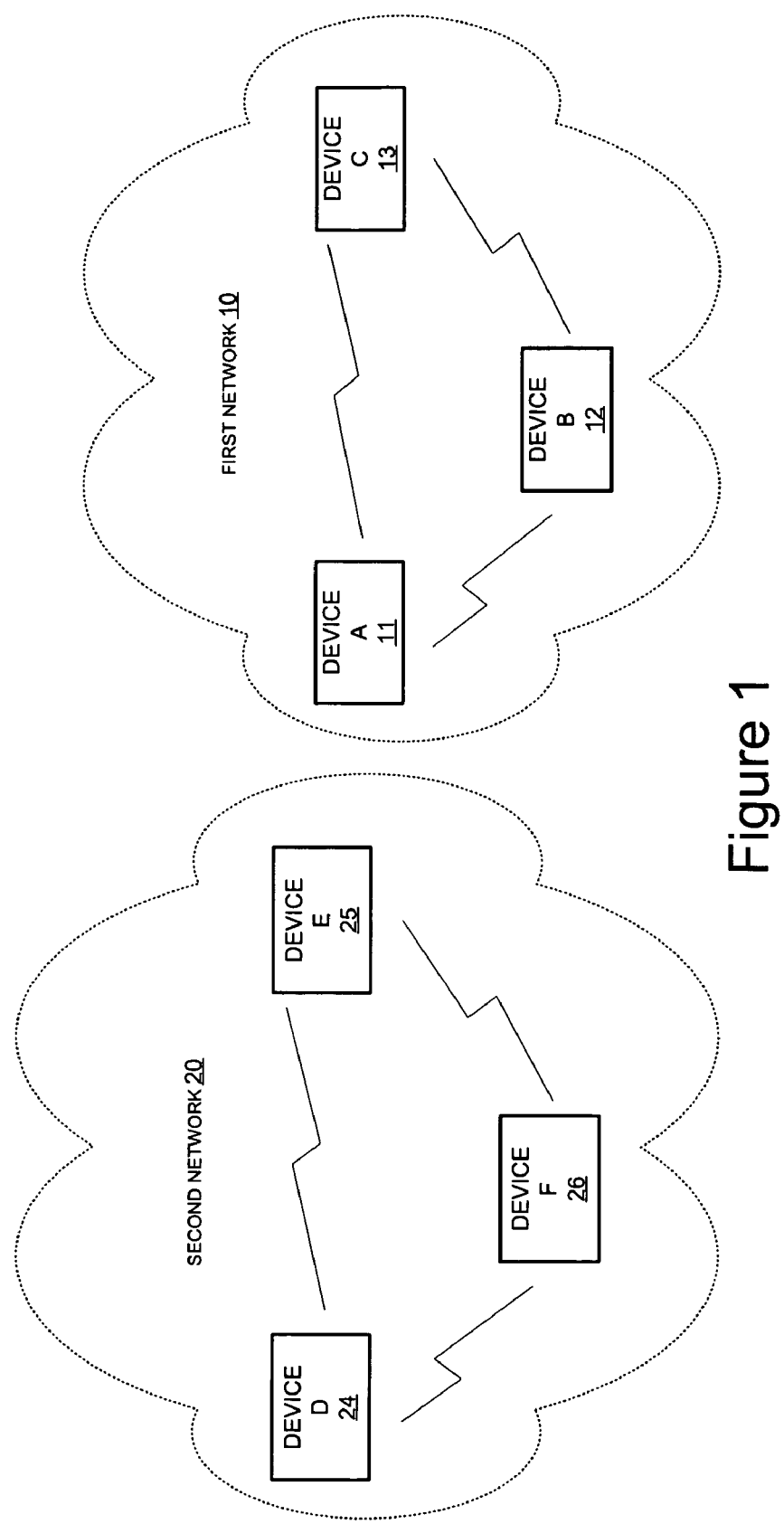
FIG. 1 illustrates two wireless networks.

Some embodiments of the invention provide an OFDM transmitter that can be used within an ultra wide band network. The transmitter is conveniently a part of a device capable of both receiving and transmitting OFDM symbols, but this is not necessarily so.

An OFDM transmitter usually includes a frequency domain portion, a frequency domain to time domain portion and a time domain portion. It is noted that a channel estimation sequence can pass through all these portions in real time, but this is not necessarily so as various frequency domain to time domain conversions can be applied off-line, even by another device, and be accessed by the OFDM transmitter in a time domain format.

Typically, an OFDM transmitter converts a stream of incoming information to multiple streams of information, each carried over a different sub-carrier. A frequency domain to time domain conversion is applied and the multiple time domain streams are converted to a single time domain streams. During each of these stages various operations, including filtering, windowing, weighing, multiplication and the like can be applied.

Conveniently, the frequency domain portion includes a mapper that groups and arranges an input data stream and add pilots, guard and null tones according to the RF transmitter modulation mode, a serial to parallel unit that receives a single stream and provides multiple streams. The frequency domain to time domain portion that may include various converters such as Inverse Discrete Fourier Transform, Inverse Fast Fourier Transform, and the like. It is noted that this section can use other Transform functions. The time domain portion conveniently includes a guard and cyclic prefix or null insertion unit that adds guard signals and cyclic prefix or null and parallel to serial unit that converts the multiple streams to a serial stream of digital signals that are converted to analog signals that in turn are up-converted, modulated and transmitted as radio frequency signals. It is noted that by using appropriate conversions various components can be moved from the frequency domain portion to the time domain portion and vice versa. It is further noted that various weighting functions, filters and the like can be applied in the frequency domain or in the time domain.

Conveniently, a channel estimation sequence includes one hundred and twenty eight sub-carriers. They include ten guard sub-carriers and six null sub-carriers. When symbols, such as information symbols, other than symbols that include a channel estimation sequence are transmitted twelve sub-carriers are pilot sub-carriers. Conveniently, the sub-carriers are conveyed over a five hundred twenty eight mage-Hertz band.

According to an embodiment of the invention a OFDM device includes a first unit, adapted to provide a channel estimation sequence that is characterized by a low peak to average ratio over a significant range of guard to information power ratio; and a transmitting path, adapted to transmit the channel estimation sequence over multiple sub-carriers. The first unit can be, for example, a MAC/PHY layers chip 63 of FIG. 2, one or more components of FIG. 3, processor 214 of FIG. 5, and the like. The transmission path can be, for example, an RF chip 62 of FIG. 2, one or more components of FIG. 3, or transmitting circuitry 216 of FIG. 5.

According to another embodiment the OFDM device includes a first unit, adapted to define a channel estimation sequence that is characterized by a low peak to average ratio at a significant guard to information power ratio; and a transmitting path, adapted to transmit the channel estimation sequence over multiple sub-carriers. The first unit can be, for example, a MAC/PHY layers chip 63 of FIG. 2, one or more components of FIG. 3, processor 214 of FIG. 5, and the like. The transmission path can be, for example, an RF chip 62 of FIG. 2, one or more components of FIG. 3, or transmitting circuitry 216 of FIG. 5.

The OFDM transmitter usually is included within a device that can support a protocol stack that includes multiple layers such as but not limited to a frame convergence sub-layer, a MAC layer, a PHY layer as well as MAC SAP, PHY SAP, frame convergence sub-layer SAP and a device management entity. Conveniently, the OFDM transmitter is a part of the PHY layer circuitry.

Examples of devices that have a PHY layer are illustrated in the following U.S. patent applications, all being incorporated herein by reference: U.S. patent application Ser. No. 10/389,789 filed on Mar. 10, 2003 and U.S. patent application Ser. No. 10/603,372 filed on Jun. 25, 2003.

Figure 2:
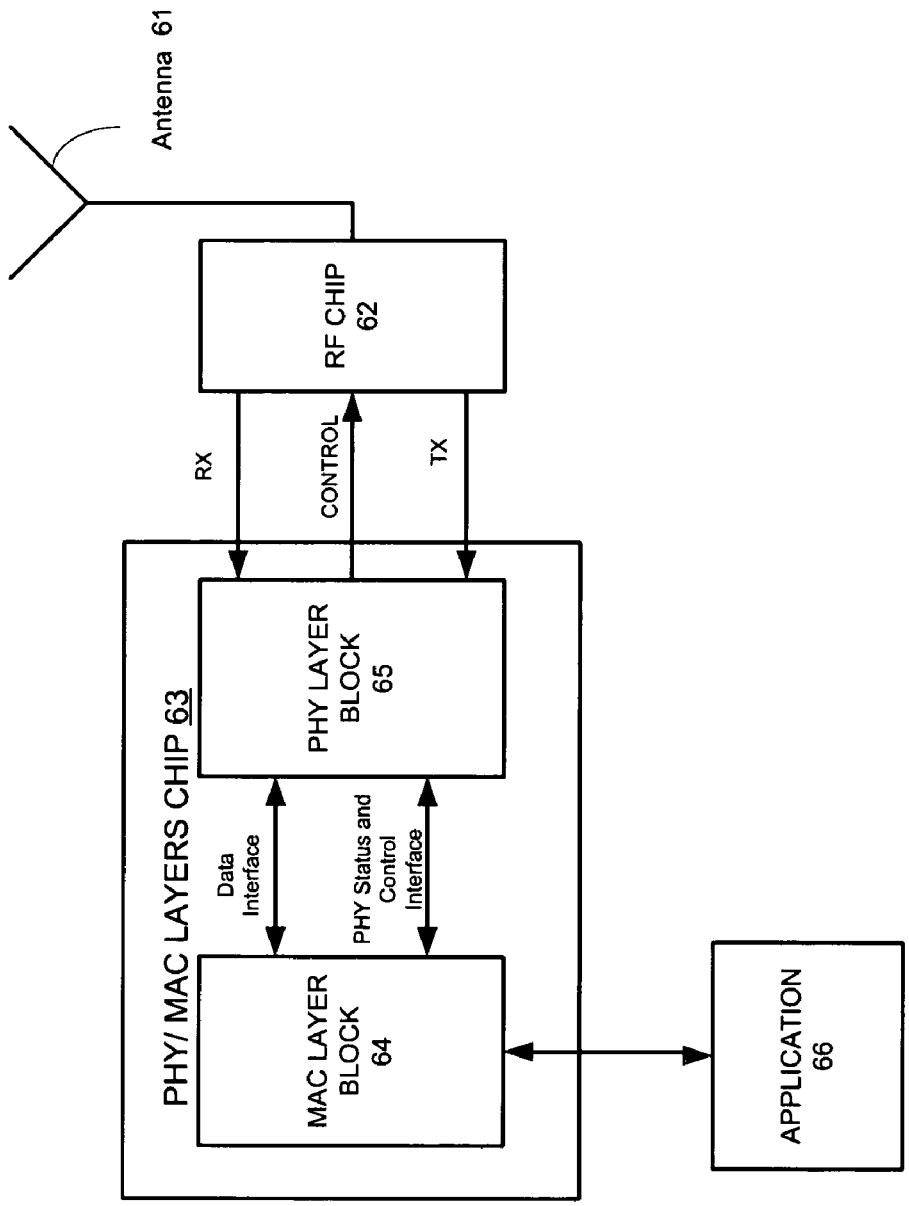
FIG. 2 illustrates a device that is capable of wireless transmission, according to an embodiment of the invention.

Wisair Inc. of Tel Aviv Israel manufactures a chip set that includes a Radio Frequency PHY layer chip and a Base-Band PHY layer chip. These chips can be connected in one end to a RF antenna and on the other hand be connected or may include a MAC layer circuitry. FIG. 2 illustrates a device 60 that is capable of wireless transmission, according to an embodiment of the invention.

Device 60 includes antenna 61 that is connected to a RF chip 62. RF chip 62 is connected to a MAC/PHY layers chip 63 that includes a PHY layer block 63 and a MAC layer block 64. The MAC/PHY layers chip 63 is connected to an application entity 66 that provides it with information to be eventually transmitted (TX) and also provides the application 66 with information received (RX) by antenna 61 and processed by PHY and MAC layers blocks 68 and 69 of FIG. 3. Some portions of the OFDM transmitter are included within the MAC/PHY layers chip 63, and especially within the PHY portion of this chip, while other are included within the RF chip 62.

Typically, the MAC layer block 64 controls the PHY layer block using a PHY status and control interface. The MAC and PHY layers exchange information (denoted TX and RX) using PHY-MAC interface 90. The RF chip 62 provides to the PHY layer block 63 received information that is conveniently down-converted to base band frequency. The RF chip 62 receives from the PHY layer block 63 information to be transmitted as well as RF control signals. The application 66 is connected to the MAC/PHY layers chip 63 by a high speed I/O interface.

Figure 3A:
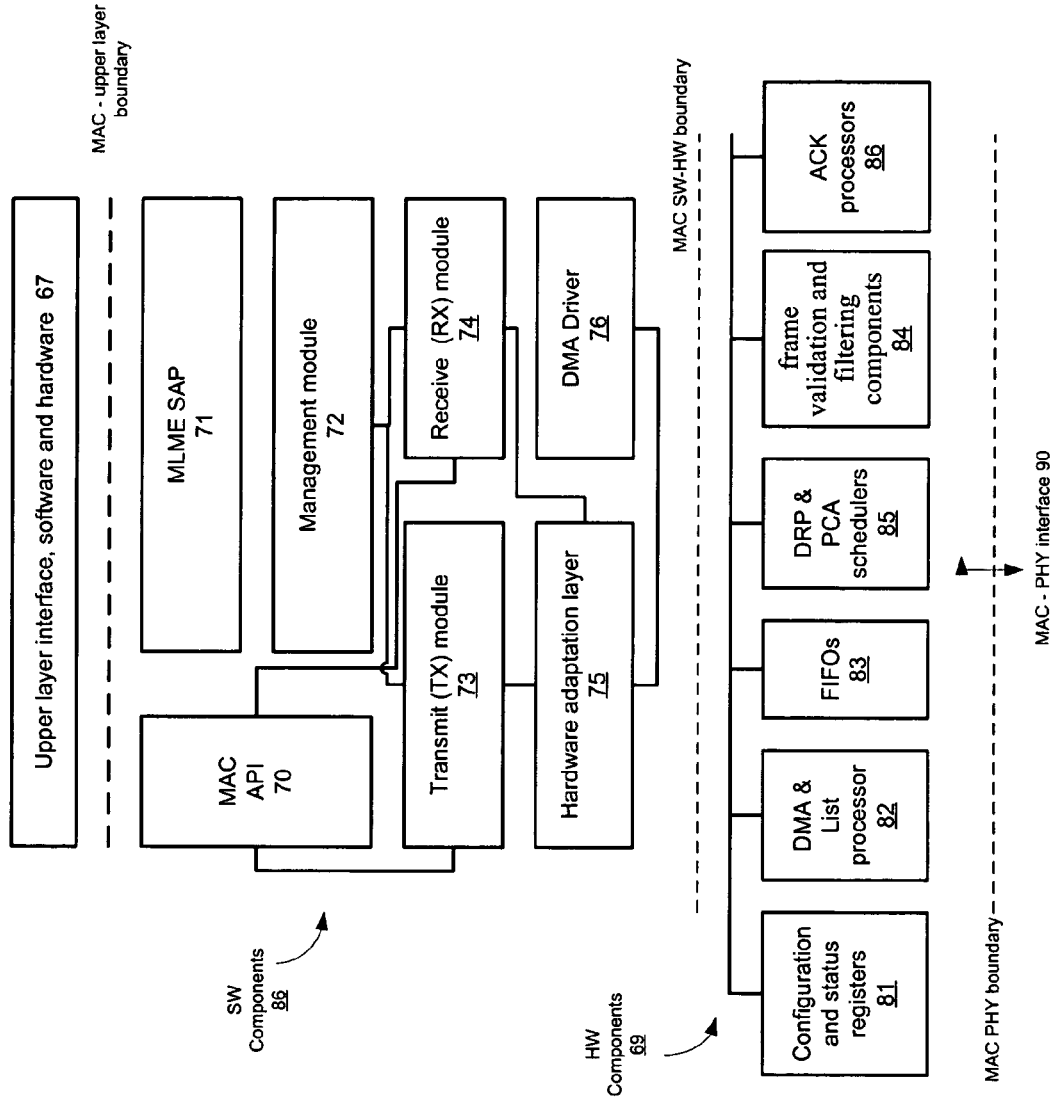
FIGS. 3A and 3B illustrate various hardware and software components of a MAC/PHY layers chip of FIG. 2, according to an embodiment of the invention.

FIG. 3 illustrates various hardware and software components of the MAC/PHY layers chip 63, according to an embodiment of the invention.

The Upper Layer IF block 64 of the MAC/PHY layers chip 63 includes hardware components (collectively denoted 69) and software components (collectively denoted 68). These components include interfaces to the PHY layer (MAC-PHY interface 90) and to the application (or higher layer components).

FIG. 3 illustrates various hardware and software components of the MAC/PHY layers chip 63, according to an embodiment of the invention. The Upper Layer IF block 64 of the MAC/PHY layers chip 63 includes hardware components (collectively denoted 69) and software components (collectively denoted 68). These components include interfaces to the PHY layer (MAC-PHY interface 90) and to the application (or higher layer components).

The hardware components 69 include configuration and status registers 81, Direct Memory Access controller 82, First In First Out (FIFO) stacks 83 and frame validation and filtering components 84, DRP and PCA slots schedulers 85, ACK processors 86, and MAC-PHY internal interface 87.

The software components 68 include a management module 72, transmit module 73, receive module 74, hardware adaptation layer 75, DMA drivers 76, MAC layer management entity (MLME) service access point (SAP) 71, MACS API 70 and the like.

These software and hardware components are capable of performing various operations and provide various services such as: providing an interface to various layers, filtering and routing of specific application packets sent to MAC data queues or provided by these queues, performing information and/or frame processing, and the like.

The routing can be responsive to various parameters such as the destinations of the packets, the Quality of Service characteristics associated with the packets, and the like.

The processing of information along a transmission path may include: forming the MAC packet itself, including MAC header formation, aggregation of packets into a bigger PHY PDU for better efficiency, fragmentation of packets for better error rate performance, PHY rate adaptation, implementation of Acknowledgements policies, and the like.

The processing of information along a reception path may include de-aggregation and/or de-fragmentation of incoming packets, implementation of acknowledgment and the like.

The hardware components are capable of transferring data between MAC software queues and MAC hardware (both TX and RX), scheduling of beacons slots, scheduling of DRP and PCA access slots, validation and filtering (according to destination address) of incoming frames, encryption/decryption operations, low-level acknowledgement processing (both in the TX path and in the RX path).

Device 60 can be a simple device or even a complex device such as but not limited to a multimedia server that is adapted to transmit information frames of different types to multiple devices. It can, for example transmit Streaming data, like voice, Video, Game applications, etc.) data files during DRP slots, and while PCA slots transmits video over IP frames, download MP3 files, download MPEG-2 files, and stream or download MPEG-4 streams.

Usually, voice frames are associated with higher quality of service requirements and accordingly are given higher transmission priorities. The voice frames QoS requirements are followed by video frames that in turn are followed by lower quality of service requirements (lower priority transmission) frames such as best effort frames and background frames.

Figure 3B:
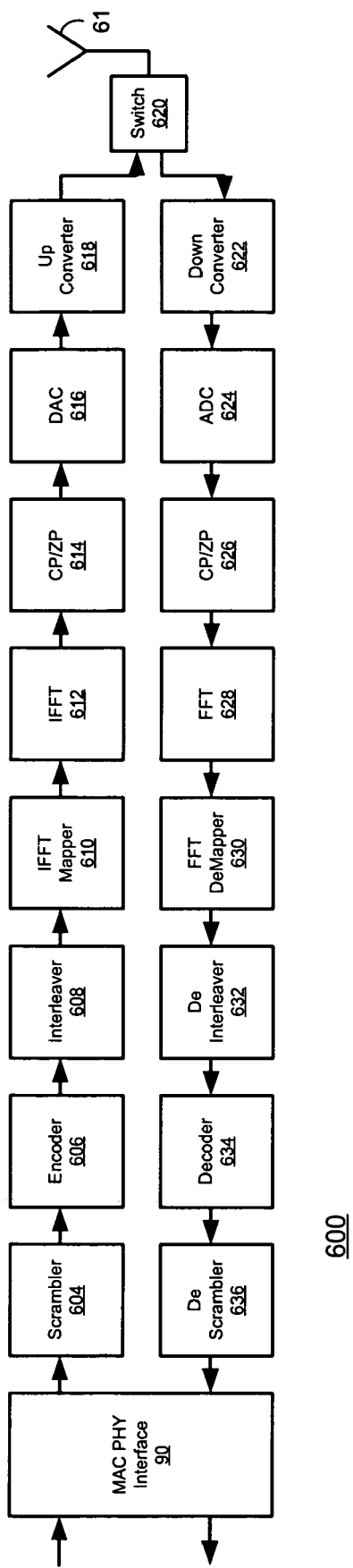

FIG. 3B illustrates various PHY layer components 600, according to an embodiment of the invention. The PHY layer components 600 include a transmission path and a reception path.

The PHY layer transmission path includes the following sequence of components: scrambler 604, encoder 606, interleaver 608, IFFT mapper 610, IFFT converter 612, CP/ZP block 614, digital to analog converter (DAC) 616, an up-converter 618, receive/transmit switch 620 and antenna 61.

The PHY layer reception path includes the following sequence of components: antenna 61, receive/transmit switch 620, down-converter 622, analog to digital converter (ADC) 624, CP/ZP block 626, FFT converter 628, FFT de-mapper 630, de-interleaver 632, decoder 634 and descrambler 636. All these components are well known in the art and do not require additional explanation.

Figure 4:
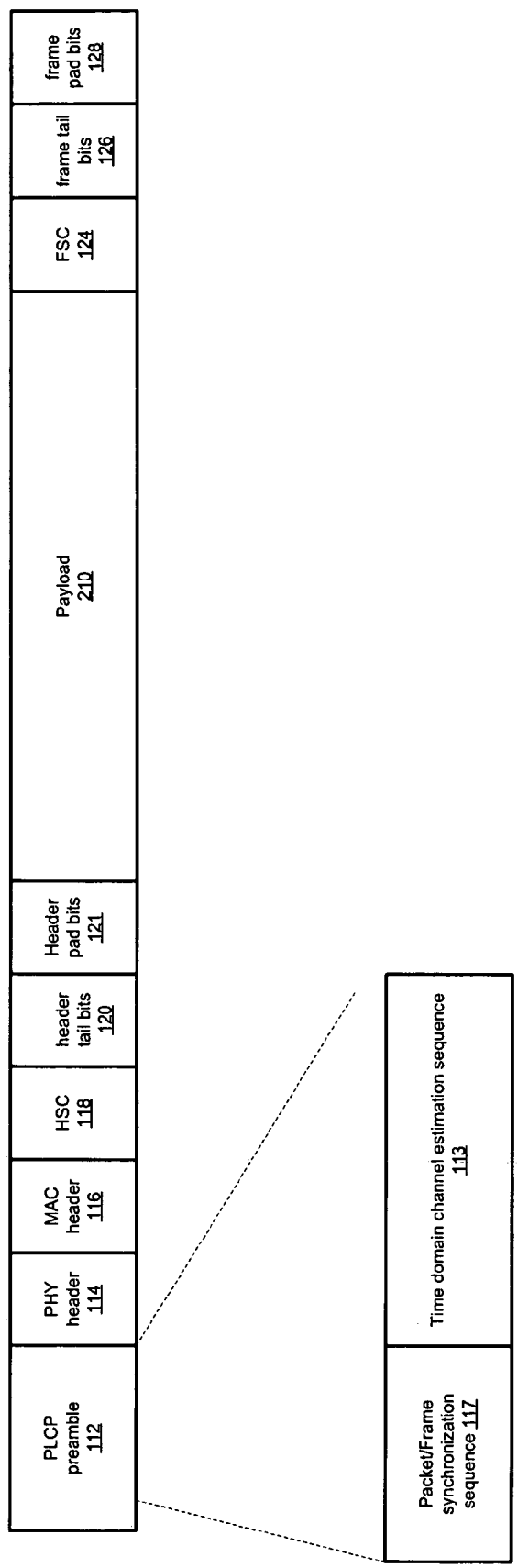
FIG. 4 illustrates a proposed MBOA information frame.

FIG. 4 illustrates a proposed MBOA information frame 100. The information frame 100 includes a physical layer convergence procedure (PLCP) preamble 112, a PHY layer header 114, a MAC layer header 116, a header check sequence field (HCS) 118, header tail bits 120, header pad bits 121, payload 122, a frame check sequence field (FCS) 124, frame tail bits 126 and pad bits 128.

The information frame 100 includes MAC layer fields such as fields 116, 118, 122 and 124. Information frame 100 also includes various PHY layer fields, such as fields 112, 114, 120, 121, 126 and 128. The payload 122 usually includes one or more MAC layer frames (also known as MSDU or MCDU) or frames of a upper communication protocol layer, such as an application layer. Typically information frame 100 includes a single upper layer frame.

The PLCP preamble 112 includes a packet and frame synchronization sequences that are followed by a channel estimation sequence 113. The exemplary time domain channel estimation sequence 113 includes six symbols, each symbol originating from the frequency domain channel estimation sequence 115 of table 1.

Conveniently, the single time domain channel estimation symbol is generated by applying an IDFT transform on frequency domain channel estimation sequence 115 and appending a zero padded prefix.

The PLCP preamble assists the receiver, among other things, to estimate the properties of the wireless medium.

MBOA proposes two possible PLCP preambles—a short PLCP preamble and a long PLCP preamble. The long PLCP preamble is used at low bit rates. At high bit rates a first frame includes the long PLCP preamble while the remaining frames include the short PLCP preamble.

The PHY layer header 114 includes information about the type of modulation, the coding rate and the spreading factor used during the transmission of the information, the length of the frame payload and scrambling information.

MAC layer header 116 includes a frame control field, source and destination identification fields, sequence control fields 117 and duration/access method fields.

The header tail bits 120 as well as the frame tail bits 126 are set to zero, thus allowing a convolutional encoder within the receiver to return to a "zero state" and improve its error probability. The header tail bits 120 (the frame tail bits 126) are followed by header pad bits 121 (frame pad bits 128) in order to align the information stream on an OFDM interleaver boundaries.

The information frame 100 is usually scrambled, encoded and interleaved. The interleaved bits are mapped to tones, provided to an Inverse Fast Fourier Transform, having guard and/or pilot tones added and is finally modulated and RF transmitted.

FIG. 5 illustrates an OFDM transmitter 220 according to another embodiment of the invention. It is noted that various configurations of transmitters can be provided without departing from the scope of the invention.

An OFDM transmitter can include software components, hardware components and/or a combination of both.

It is noted that FIG. 5 illustrates an OFDM transmitter 220 that is represented by various boxes but this does not necessarily mean that this partition is mandatory. For example, a single circuit, logic, unit or code can perform the operations that are represented by more than a single box and vice versa.

It is further notes that OFDM transmitters can include less boxes, more boxes and that the order of boxes can be changed, according to various embodiments of the invention.

OFDM transmitter 220 includes a storage unit 212, a processor 214, and transmitting circuitry 216. They can be connected to each other in various manners, such as by a central bus, by multiple lines, and the like. The transmitting circuitry 216 usually includes at least one modulator, at least one frequency up-converter, at least one digital to analog converter, at least one antenna, and the like. It can reside within a RF chip such as chip 62.

The storage unit 212 stores information to be transmitter and can also store channel estimation information. The OFDM transmitter 220 eventually transmits a channel estimation sequence. The channel estimation sequence is generated by applying a sequence of processing stages, some can be performed off-line while some processing stages can be performed in real time. Off line usually refers to processing stages that are applied in order to provide the channel estimation information that is stored in storage unit 212. Real time refers to processing stages that occur just before the channel estimation sequence is actually transmitted.

Some of the processing stages can be executed by entities other by the OFDM transmitter 220. For example, a processor that does not belong to the OFDM transmitter, and even another OFDM transmitter 220 can perform various stages and then send processed channel estimation information to OFDM transmitter 2200.

Yet according to another embodiment of the invention the processor 214 can fetch channel estimation information, process it and return the processed channel estimation information to the storage unit 212.

The channel estimation information can stored in various formats, including a time domain format and a frequency domain format. Conveniently, some of the processing stages, such as applying a weighing function, filtering, windowing and the like, can be applied in both the frequency domain and in the time domain. Furthermore, various frequency domain to time domain conversions can be applied. The inventors used the Inverse Fourier discrete transform, although other conversions can be applied.

According to various embodiments of the invention the various processing stages may include at least one or the following processing stages or a combination of more than one of the following processing stages: filtering, weighing, multiplication by a real imaginary or complex number, null, insertion of non-information conveying signals, order manipulation (especially cyclic operations or reverse order) modulation, and the like.

According to an embodiment of the invention the OFDM transmitter 220 transmits a channel estimation sequence that is characterized by a low peak to average ratio over a significant range of guard to information power ratio. Conveniently, the significant range exceeds 5 db and even 10 db.

According to yet another embodiment of the invention the OFDM transmitter 220 transmits a channel estimation sequence that is characterized by a low peak to average ratio at a significant guard to information power ratio.

According to an embodiment of the invention the OFDM transmitter 220 transmits a channel estimation sequence that originated from or otherwise was generated by utilizing a certain frequency domain sequence that includes at least the following elements: $(1+j)*(1, 1, -1, 1, -1, -1, 1, -1, 1, -1, 1, 1, -1, -1, -1, 1, 1, -1, 1, -1, 1, 1, 1, -1, 1, 1, 1, -1, -1, 1, 1, 1, 1, -1, -1, 1, -1, 1, 1, 1, -1, -1, 1, 1, -1, -1, 1, -1, 1, 1, 1, 1, 1, -1, 1, 1, -1, -1, -1, -1, -1)$, whereas j is the square root of minus one.

According to another embodiment of the invention the storage unit 212 stores a channel estimation sequence that includes that certain frequency domain sequence as well as a conjugate sequence. According to an embodiment of the invention the channel estimation information also includes guard information that can have various values. The power of guard tones can vary from device to device. They are typically weaker than the information tones, but this is not necessarily so. An exemplary frequency domain channel estimation sequence includes one hundred and twenty eight tones (spectral components). The two highest tones ($62^{nd}$-$63^{rd}$ tones), the central tone ($0^{th}$) as well as the three lowest tones ($-63^{th}$--62nd tones) are null tones. They usually have a zero value. The next five tones ($57^{th}$-$61^{th}$ tones, and the $-61^{th}$-$57^{th}$ tones) are guard tones. The $56^{th}$ tone till $1^{st}$ tone are the certain frequency domain sequence. The $56^{th}$ tone till the $-1^{th}$ tone are a conjugate sequence.

Table 1 illustrates in greater details the spectral components of an exemplary frequency domain channel estimation sequence.

TABLE 1

| Tone index | Value | Remark | Tone index | Value | Tone index | Value |
|---|---|---|---|---|---|---|
| −64 | 0 | null tone | −21 | $(1 − j)/\sqrt{2}$ | 22 | $(1 + j)/\sqrt{2}$ |
| −63 | 0 | null tone | −20 | $(−1 + j)/\sqrt{2}$ | 23 | $(1 + j)/\sqrt{2}$ |
| −62 | 0 | null tone | −19 | $(1 − j)/\sqrt{2}$ | 24 | $(−1 − j)/\sqrt{2}$ |
| −61 | $(−1 + j)/\sqrt{2}$ | Guard | −18 | $(−1 + j)/\sqrt{2}$ | 25 | $(1 + j)/\sqrt{2}$ |
| −60 | $(−1 + j)/\sqrt{2}$ | Guard | −17 | $(1 − j)/\sqrt{2}$ | 26 | $(1 + j)/\sqrt{2}$ |
| −59 | $(−1 + j)/\sqrt{2}$ | Guard | −16 | $(1 − j)/\sqrt{2}$ | 27 | $(1 + j)/\sqrt{2}$ |
| −58 | $(−1 + j)/\sqrt{2}$ | Guard | −15 | $(−1 + j)/\sqrt{2}$ | 28 | $(−1 − j)/\sqrt{2}$ |
| −57 | $(−1 + j)/\sqrt{2}$ | Guard | −14 | $(−1 + j)/\sqrt{2}$ | 29 | $(−1 − j)/\sqrt{2}$ |
| −56 | $(1 − j)/\sqrt{2}$ | | −13 | $(−1 + j)/\sqrt{2}$ | 30 | $(1 + j)/\sqrt{2}$ |
| −55 | $(1 − j)/\sqrt{2}$ | | −12 | $(1 − j)/\sqrt{2}$ | 31 | $(1 + j)/\sqrt{2}$ |
| −54 | $(−1 + j)/\sqrt{2}$ | | −11 | $(1 − j)/\sqrt{2}$ | 32 | $(1 + j)/\sqrt{2}$ |
| −53 | $(1 − j)/\sqrt{2}$ | | −10 | $(−1 + j)/\sqrt{2}$ | 33 | $(1 + j)/\sqrt{2}$ |
| −52 | $(1 − j)/\sqrt{2}$ | | −9 | $(1 − j)/\sqrt{2}$ | 34 | $(−1 − j)/\sqrt{2}$ |
| −51 | $(1 − j)/\sqrt{2}$ | | −8 | $(−1 + j)/\sqrt{2}$ | 35 | $(−1 − j)/\sqrt{2}$ |
| −50 | $(1 − j)/\sqrt{2}$ | | −7 | $(1 − j)/\sqrt{2}$ | 36 | $(1 + j)/\sqrt{2}$ |
| −49 | $(1 − j)/\sqrt{2}$ | | −6 | $(−1 + j)/\sqrt{2}$ | 37 | $(−1 − j)/\sqrt{2}$ |
| −48 | $(−1 + j)/\sqrt{2}$ | | −5 | $(−1 + j)/\sqrt{2}$ | 38 | $(1 + j)/\sqrt{2}$ |
| −47 | $(1 − j)/\sqrt{2}$ | | −4 | $(1 − j)/\sqrt{2}$ | 39 | $(1 + j)/\sqrt{2}$ |
| −46 | $(−1 + j)/\sqrt{2}$ | | −3 | $(−1 + j)/\sqrt{2}$ | 40 | $(1 + j)/\sqrt{2}$ |

TABLE 1-continued

| Tone index | Value | Remark | Tone index | Value | Tone index | Value | |
|---|---|---|---|---|---|---|---|
| −45 | (−1 + j)/√2 |  | −2 | (1 − j)/√2 | 41 | (−1 − j)/√2 | |
| −44 | (1 − j)/√2 |  | −1 | (1 − j)/√2 | 42 | (−1 − j)/√2 | |
| −43 | (1 − j)/√2 |  | 0 | 0 | 43 | (1 + j)/√2 | |
| −42 | (−1 + j)/√2 |  | 1 | (1 + j)/√2 | 44 | (1 + j)/√2 | |
| −41 | (−1 + j)/√2 |  | 2 | (1 + j)/√2 | 45 | (−1 − j)/√2 | |
| −40 | (1 − j)/√2 |  | 3 | (−1 − j)/√2 | 46 | (−1 − j)/√2 | |
| −39 | (1 − j)/√2 |  | 4 | (1 + j)/√2 | 47 | (1 + j)/√2 | |
| −38 | (1 − j)/√2 |  | 5 | (−1 − j)/√2 | 48 | (−1 − j)/√2 | |
| −37 | (−1 + j)/√2 |  | 6 | (−1 − j)/√2 | 49 | (1 + j)/√2 | |
| −36 | (1 − j)/√2 |  | 7 | (1 + j)/√2 | 50 | (1 + j)/√2 | |
| −35 | (−1 + j)/√2 |  | 8 | (−1 − j)/√2 | 51 | (1 + j)/√2 | |
| −34 | (−1 + j)/√2 |  | 9 | (1 + j)/√2 | 52 | (1 + j)/√2 | |
| −33 | (1 − j)/√2 |  | 10 | (−1 − j)/√2 | 53 | (1 + j)/√2 | |
| −32 | (1 − j)/√2 |  | 11 | (1 + j)/√2 | 54 | (−1 − j)/√2 | |
| −31 | (1 − j)/√2 |  | 12 | (1 + j)/√2 | 55 | (1 + j)/√2 | |
| −30 | (1 − j)/√2 |  | 13 | (−1 − j)/√2 | 56 | (1 + j)/√2 | |
| −29 | (−1 + j)/√2 |  | 14 | (−1 − j)/√2 | 57 | (−1 − j)/√2 | Guard |
| −28 | (−1 + j)/√2 |  | 15 | (−1 − j)/√2 | 58 | (−1 − j)/√2 | Guard |
| −27 | (1 − j)/√2 |  | 16 | (1 + j)/√2 | 59 | (−1 − j)/√2 | Guard |
| −26 | (1 − j)/√2 |  | 17 | (1 + j)/√2 | 60 | (−1 − j)/√2 | Guard |
| −25 | (1 − j)/√2 |  | 18 | (−1 − j)/√2 | 61 | (−1 − j)/√2 | Guard |
| −24 | (−1 + j)/√2 |  | 19 | (1 + j)/√2 | 62 | 0 | Null tone |
| −23 | (1 − j)/√2 |  | 20 | (−1 − j)/√2 | 63 | 0 | Null tone |
| −22 | (1 − j)/√2 |  | 21 | (1 + j)/√2 |  |  | |

As previously mentioned other guard tones as well as other padding signals can be used. Even if the values of the guard tones are dramatically changed the peak to average ration of a channel estimation sequence that will generated in response to that symbol will remain low.

Figure 6A:
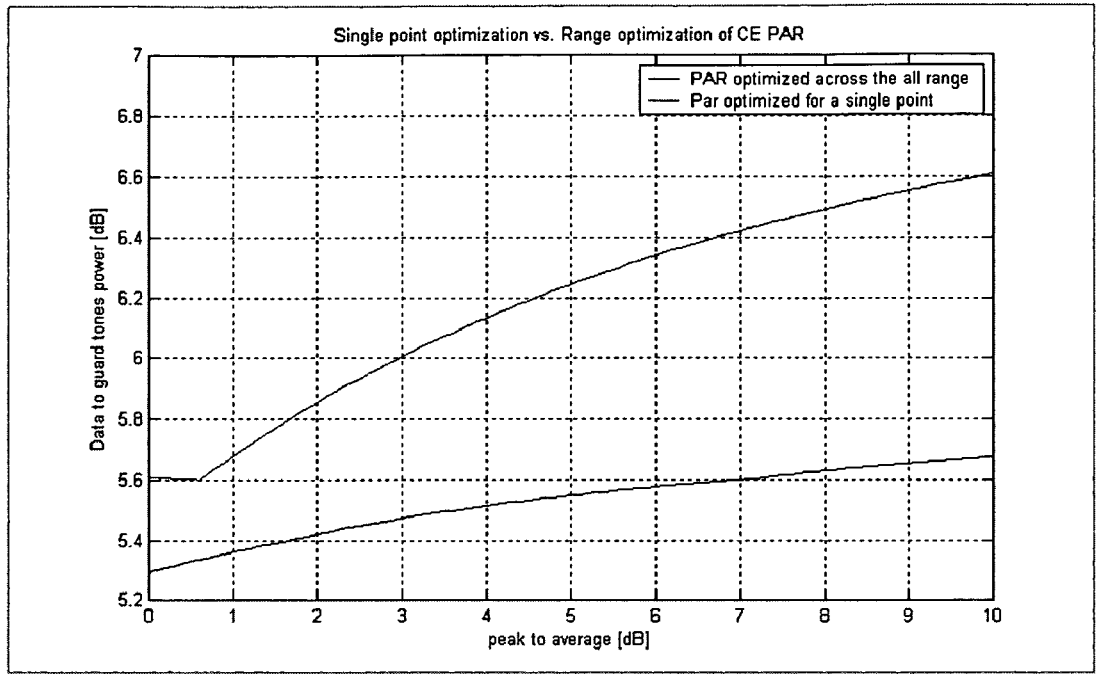
FIGS. 6A and 6B illustrate the peak to average ratio achieved over various guard to information power ratios.
Figure 6B:
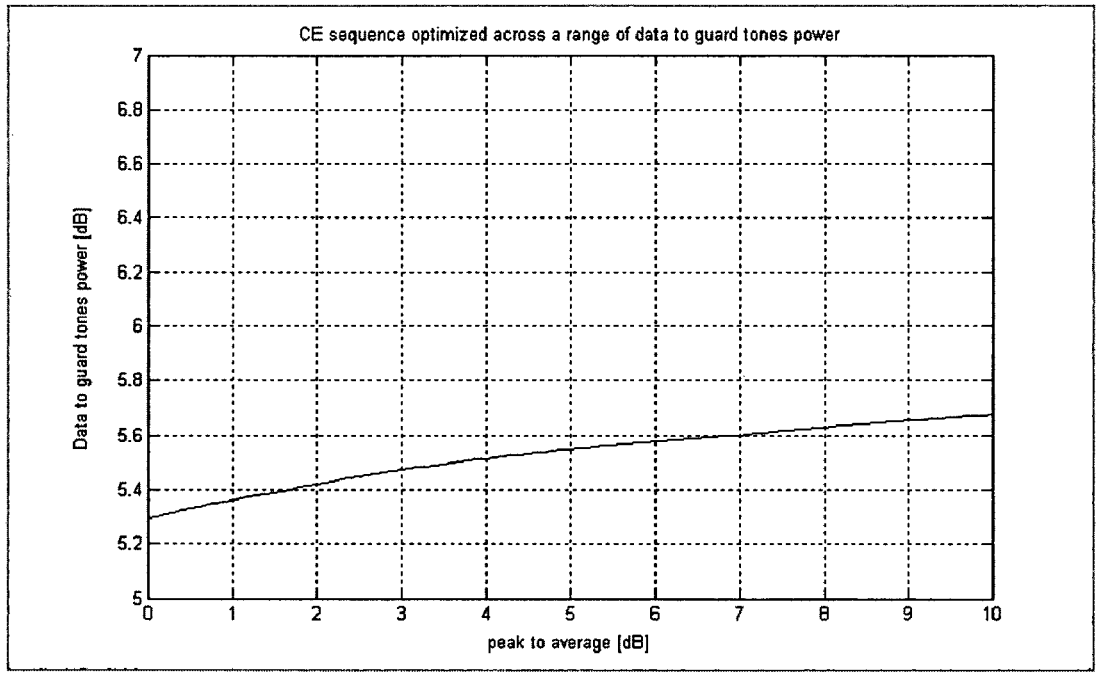

FIGS. 6A and 6B illustrate the peak to average ratio achieved over various guard to information power ratios.

The lower curve of FIG. 6A is actually the only curve of FIG. 6B and illustrates the relationship between: (i) data to guard tome power ratio, and (ii) peak to average ratio of a sequence that was optimized to provide optimal performance over a range of data to guard tone ratios.

The upper curve of FIG. 6A illustrates the relationship between: (i) data to guard tome power ratio, and (ii) peak to average ratio of another sequence that was optimized to provide optimal performance at a certain data to guard tone ratio (0 db).

Figure 7:
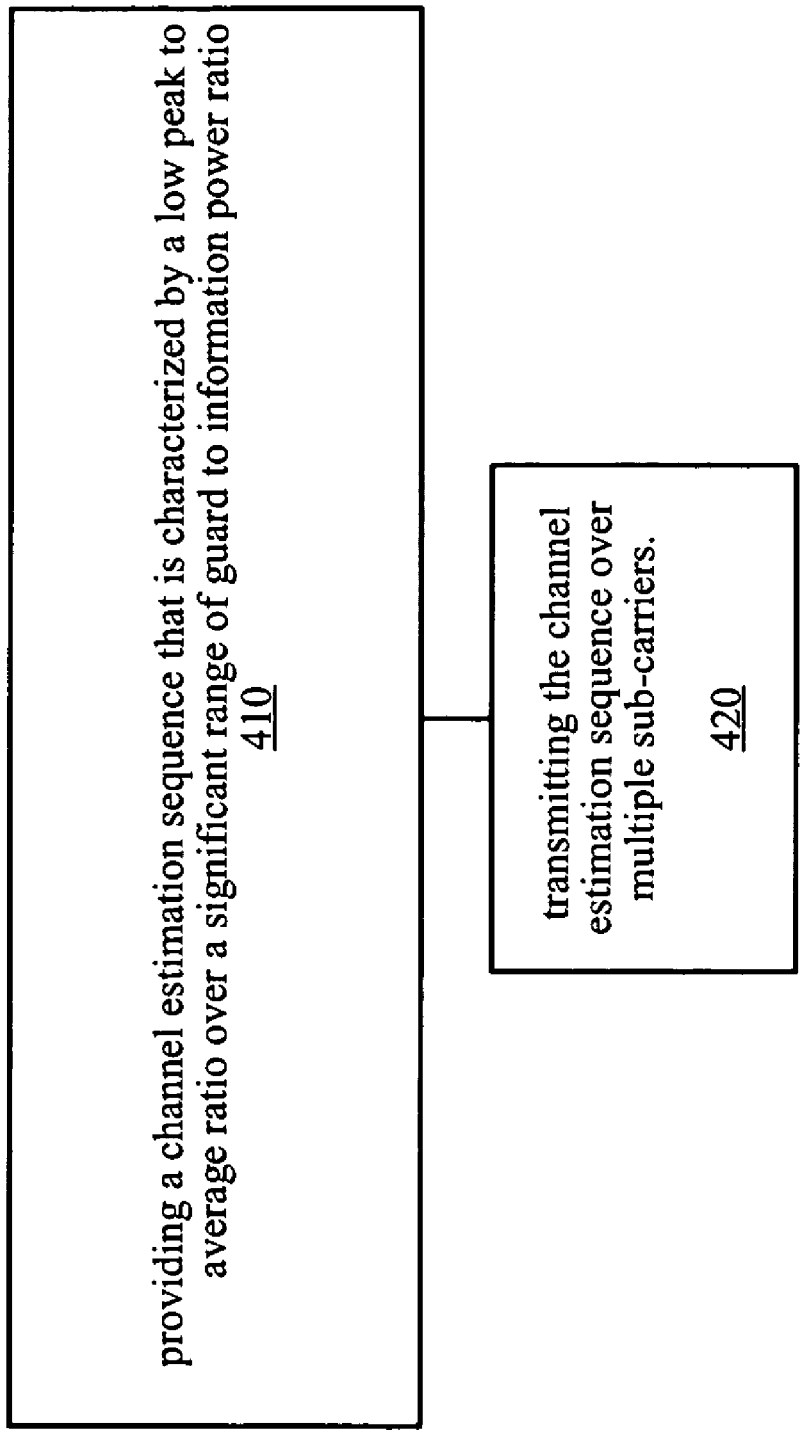
FIG. 7 is a flow chart of method 400 for OFDM transmission, according to an embodiment of the invention.

FIG. 7 is a flow chart of method 400 for orthogonal frequency division multiplexing (OFDM) transmission, according to an embodiment of the invention.

Method 400 starts by stage 410 of providing a channel estimation sequence that is characterized by a low peak to average ratio over a significant range of guard to information power ratio. Conveniently, the Conveniently, stage 410 includes utilizing a certain frequency domain sequence that includes at least the following elements: $(1+j)*(1, 1, -1, 1, -1, -1, 1, -1, 1, 1, -1, 1, -1, 1, 1, -1, -1, -1, 1, 1, -1, 1, -1, 1, 1, 1, -1, 1, 1, 1, -1, -1, 1, 1, -1, 1, 1, 1, 1, -1, -1, 1, -1, 1, 1, -1, -1, 1, -1, 1, 1, 1, 1, -1, 1, 1, 1, -1, -1, -1, -1, -1)$, whereas j is the square root of minus one. Conveniently, the certain domain sequence is illustrated in table 1.

Conveniently, the utilizing includes performing a frequency domain to time domain conversion. Conveniently, the utilizing includes performing an inverse Fourier transform. Conveniently, the utilizing includes applying a weighting function. Conveniently, the utilizing includes applying a filter. Conveniently, stage 410 Conveniently stage 410 includes generating a conjunctive sequence. Conveniently, stage 410 includes providing guard tones.

transmitting the channel estimation sequence over multiple sub-carriers.

Figure 8:
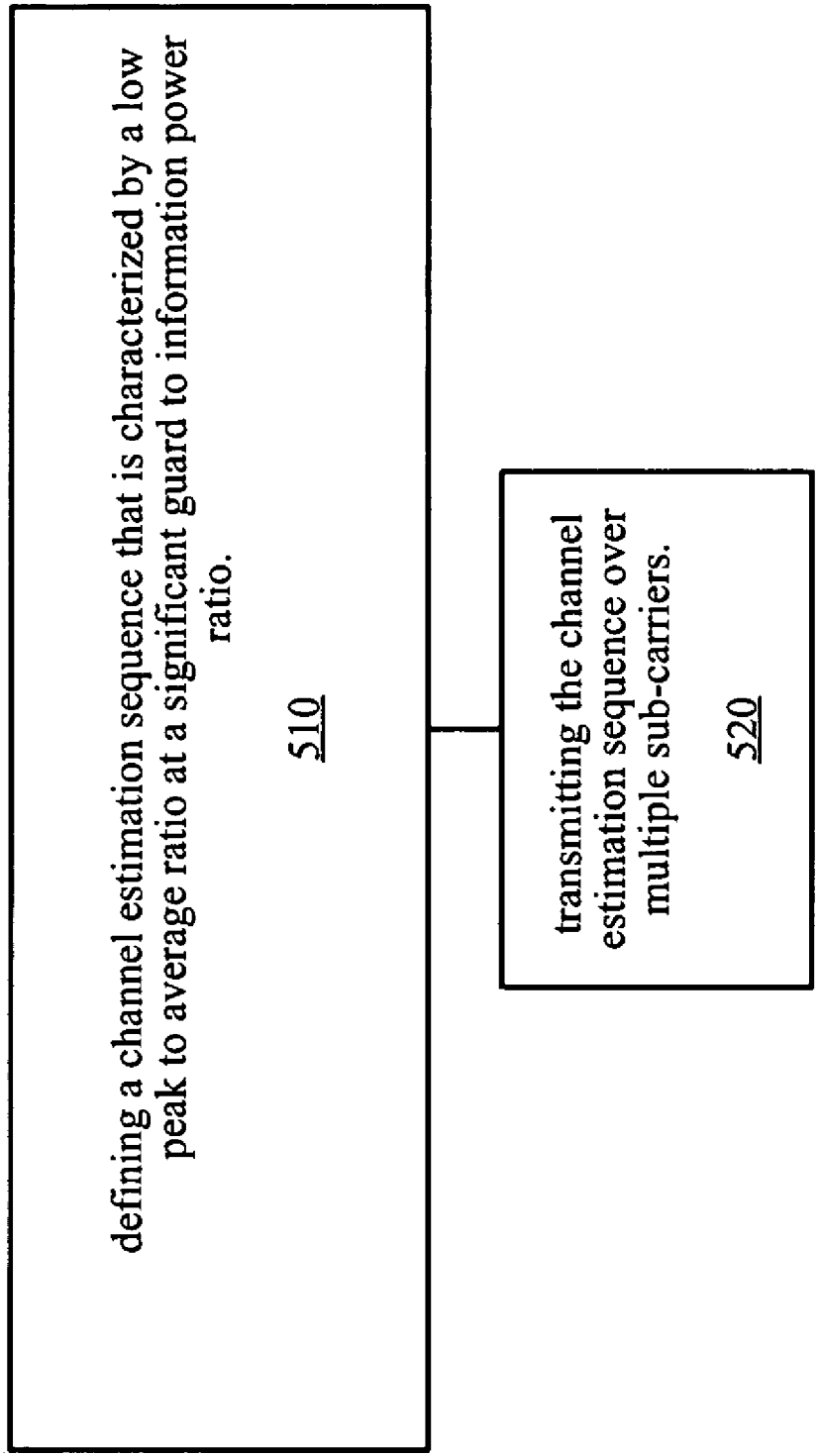
FIG. 8 is a flow chart of method 500 for OFDM transmission, according to an embodiment of the invention.

FIG. 8 is a flow chart of method 500 for orthogonal frequency division multiplexing (OFDM) transmission, according to an embodiment of the invention.

Method 500 starts by stage 510 of defining a channel estimation sequence that is characterized by a low peak to average ratio at a significant guard to information power ratio. Conveniently, the Conveniently, stage 510 includes utilizing a certain frequency domain sequence that includes at least the following elements: $(1+j)*(1, 1, -1, 1, -1, -1, 1, -1, 1, -1, 1, 1, 1, -1, -1, -1, 1, 1, -1, 1, -1, 1, 1, 1, -1, 1, 1, 1, -1, -1, 1, 1, 1, -1, -1, 1, 1, -1, -1, 1, 1, -1, -1, 1, -1, 1, 1, 1, 1, 1, 1, -1, 1, 1, -1, -1, -1, -1, -1)$, whereas j is the square root of minus one. Conveniently, the certain domain sequence is illustrated in table 1. Conveniently, the utilizing includes performing a frequency domain to time domain conversion. Conveniently, the utilizing includes performing an inverse Fourier transform. Conveniently, the utilizing includes applying a weighting function. Conveniently, the utilizing includes applying a filter. Conveniently, stage 510 Conveniently stage 510 includes generating a conjunctive sequence. Conveniently, stage 510 includes providing guard tones.

Stage 510 is followed by stage 520 of transmitting the channel estimation sequence over multiple over multiple sub-carriers.

According to an embodiment of the invention a received can perform channel estimation using a channel estimation sequence that is characterized by a low peak to average ratio over a significant range of guard to information power ratio.

According to an embodiment of the invention a received can perform channel estimation using a channel estimation sequence that is characterized by defining a channel estimation sequence that is characterized by a low peak to average ratio at a significant guard to information power ratio.

According to an embodiment of the invention a received can perform channel estimation using a channel estimation sequence that originated from or is responsive to the following elements: $(1+j)*(1, 1, -1, 1, -1, -1, 1, -1, 1, 1, -1, -1, -1, 1, 1, -1, 1, -1, 1, 1, 1, -1, 1, 1, 1, -1, -1, 1, 1, 1, 1, -1,$ −1, 1, −1, 1, 1, 1, −1, −1, 1, 1, −1, −1, 1, −1, 1, 1, 1, 1, 1, −1, 1, 1, −1, −1, −1, −1, −1), whereas j is the square root of minus one. It will be apparent to those skilled in the art that the disclosed subject matter may be modified in numerous ways and may assume many embodiments other then the preferred form specifically set out and described above. It is noted that each of the mentioned above circuitries can be applied by hardware, software, middleware or a combination of the above. The mentioned above methods can be stored in a computer readable medium, such as but not limited to tapes, disks, diskettes, compact discs, and other optical and/or magnetic medium.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

I claim:

1. A method for orthogonal frequency division multiplexing (OFDM) transmission, the method comprising the stages of: providing a channel estimation sequence that is characterized by a low peak to average ratio over a significant range of guard to information power ratio, wherein the significant range exceeds 5 db; and transmitting by a transmitting circuitry of an OFDM device the channel estimation sequence over multiple sub-carriers, whereas the stage of providing involves utilizing a certain frequency domain sequence that comprises at least the following elements: $(1+j)*(1, 1, -1, 1, -1, -1, 1, -1, 1, -1, 1, 1, -1, -1, -1, 1, 1, -1, 1, -1, 1, 1, 1, -1, 1, 1, 1, -1, -1, 1, 1, 1, 1, -1, -1, 1, -1, 1, 1, 1, -1, -1, 1, 1, -1, -1, 1, 1, 1, 1, 1, -1, 1, 1, -1, -1, -1, -1, -1)$, whereas j is the square root of minus one.

2. The method of claim 1 whereas the utilizing comprises performing a frequency domain to time domain conversion.

3. The method of claim 1 whereas the utilizing comprises performing an inverse Fourier transform.

4. The method of claim 1 whereas the utilizing comprises applying a weighting function.

5. The method of claim 1 whereas the utilizing comprises applying a filtering operation.

6. The method of claim 1 whereas the providing comprises generating a conjunctive sequence.

7. The method of claim 1 whereas the providing further comprises providing guard tones.

8. A method for orthogonal frequency division multiplexing (OFDM) transmission, the method comprising the stage of: defining a channel estimation sequence that is characterized by a low peak to average ratio at a significant guard to information power ratio, wherein the significant range exceeds 5 d; and transmitting by a transmitting circuitry of an OFDM device the channel estimation sequence over multiple over multiple sub-carriers, whereas the stage of defining involves utilizing a certain frequency domain sequence that comprises at least the following elements: $(1+j)*(1, 1, -1, 1, -1, -1, 1, -1, 1, -1, 1, 1, -1, -1, -1, 1, 1, -1, 1, -1, 1, 1, 1, -1, 1, 1, 1, -1, -1, 1, 1, 1, 1, -1, -1, 1, -1, 1, 1, 1, -1, -1, 1, 1, -1, -1, 1, 1, 1, 1, 1, -1, 1, 1, -1, -1, -1, -1, -1)$, whereas j is the square root of minus one.

9. The method of claim 8 whereas the utilizing comprises performing a frequency domain to time domain conversion.

10. The method of claim 8 whereas the utilizing comprises performing an inverse Fourier transform.

11. The method of claim 8 whereas the utilizing comprises applying a weighting function.

12. The method of claim 8 whereas the utilizing comprises applying a filter.

13. The method of claim 8 whereas the providing comprises generating a conjunctive sequence.

14. The method of claim 8 whereas the providing further comprises providing guard tones.

15. An OFDM device, comprising: a first unit, adapted to provide a channel estimation sequence that is characterized by a low peak to average ratio over a significant range of guard to information power ratio, wherein the significant range exceeds 5 d; and a transmitting circuitry, adapted to transmit the channel estimation sequence over multiple sub-carriers, wherein the device is adapted to utilize a certain frequency domain sequence that comprises at least the following elements: $(1+j)*(1, 1, -1, 1, -1, -1, 1, -1, 1, -1, 1, 1, -1, -1, -1, 1, 1, -1, 1, -1, 1, 1, 1, -1, 1, 1, 1, -1, -1, 1, 1, 1, 1, -1, -1, 1, -1, 1, 1, 1, -1, -1, 1, 1, -1, -1, 1, 1, 1, 1, 1, -1, 1, 1, -1, -1, -1, -1, -1)$, whereas j is the square root of minus one.

16. The device of claim 15 adapted to perform a frequency domain to time domain conversion.

17. The device of claim 15 adapted to perform an inverse Fourier transform.

18. The device of claim 15 adapted to apply a weighting function.

19. The device of claim 15 adapted to apply a filtering operation.

20. The device of claim 15 adapted to generate a conjunctive sequence.

21. The device of claim 15 further adapted to provide guard tones.

* * * * *